United States Patent
Kretz (10) Patent No.: US 8,023,053 B2
(45) Date of Patent: Sep. 20, 2011

(54) ACTIVE-MATRIX LIQUID CRYSTAL MATRIX DISPLAY

(75) Inventor: Thierry Kretz, Saint Jean de Moirans (FR)

(73) Assignee: Thales, Neuilly sur Seine (FR)

(*) Notice: Subject to any disclaimer, the term of this patent is extended or adjusted under 35 U.S.C. 154(b) by 337 days.

(21) Appl. No.: 12/066,327

(22) PCT Filed: Sep. 7, 2006

(86) PCT No.: PCT/EP2006/066130
§ 371 (c)(1),
(2), (4) Date: Aug. 21, 2008

(87) PCT Pub. No.: WO2007/028818
PCT Pub. Date: Mar. 15, 2007

(65) Prior Publication Data
US 2009/0303404 A1    Dec. 10, 2009

(30) Foreign Application Priority Data
Sep. 9, 2005 (FR) ........................... 05 09224

(51) Int. Cl.
*G02F 1/1343* (2006.01)
(52) U.S. Cl. ................. 349/38; 349/39; 349/40
(58) Field of Classification Search .......... None
See application file for complete search history.

(56) References Cited

U.S. PATENT DOCUMENTS

| 6,411,272 B1 | 6/2002 | Edwards |
| 2002/0101547 A1* | 8/2002 | Lee et al. ................. 349/40 |
| 2006/0146209 A1 | 7/2006 | Kretz et al. |

FOREIGN PATENT DOCUMENTS

| EP | 0 883 102 | 12/1998 |
| JP | 7 120721 | 5/1995 |

OTHER PUBLICATIONS

Magarino, J., et al., "R&D and Fabrication of Integrated Amorphous Silicon Drivers AMLCDS: A Review", International Display Workshop, pp. 303 to 306, 2004.
U.S. Appl. No. 11/997,679, filed Feb. 1, 2008, Lebrun, et al.
U.S. Appl. No. 12/063,359, filed Feb. 8, 2008, Lebrun, et al.
U.S. Appl. No. 12/049,747, filed Mar. 17, 2008, Kretz, et al.

* cited by examiner

*Primary Examiner* — Michelle R Connelly Cushwa
(74) *Attorney, Agent, or Firm* — Oblon, Spivak, McClelland, Maier & Neustadt, L.L.P.

(57) ABSTRACT

In an active matrix for a liquid crystal display, including a plurality of pixel electrodes in an active zone, each of which can be addressed using one selection line among N selection lines and one data line among M data lines, a storage capacitor is connected to each pixel electrode in the matrix, and a line stabilization capacitor is provided for each selection line in the matrix. A first electrode of the stabilization capacitor is connected to the selection line and a second electrode is connected to a reference voltage. Such a structure may find application to active matrix type liquid crystal displays, particularly with integrated drivers.

17 Claims, 6 Drawing Sheets

ACTIVE-MATRIX LIQUID CRYSTAL MATRIX DISPLAY

FIELD OF THE INVENTION

This invention relates to a matrix type Liquid Crystal Display (LCD) and more particularly active matrix type displays.

Active matrix displays comprise an active element in each pixel that is controlled appropriately by a pixel addressing device to display a grey level corresponding to data to be displayed.

The pixel addressing device usually comprises a control circuit to control rows selection lines on the display, usually called line driver, through which rows are selected one by one in sequence on each video frame, and a pixel column control circuit on the display commonly called the column driver, through which the voltage levels corresponding to data to be displayed are applied on the columns. In the following, the term driver or drivers will be used to designate these control circuits or the addressing device. These drivers are said to be integrated when they are made on the same substrate as the active matrix, around the periphery of this matrix and with the same manufacturing technology.

DISCUSSION OF THE BACKGROUND

According to the state of the art of amorphous silicon technology, integrated line drivers are of the high output impedance type so as to limit the transistor stress and therefore the drift in the threshold voltage of these transistors. With this type of driver, when lines are not selected (which is the case during more than 99% of the display addressing time) they are in a so-called floating state. In this state, the lines are sensitive to all parasite variations and particularly variations related to capacitive couplings due to intersection of lines and columns. More precisely, for each new selected line, the data to be displayed is applied on all columns of the display: as a result of capacitive couplings due to intersection between lines and columns, the voltage levels of unselected lines vary on these columns. This has an effect on the display quality of the display.

In particular, these couplings can lead to unwanted selection of a line on the display and as a result data on this line may be modified. This is the so-called multi-line selection problem.

Other unwanted effects can occur depending on the method used to make the storage capacitor associated with each pixel electrode of the active matrix. In particular, when this storage capacitor is made using the pixel row selection line, these couplings will also cause variations in voltage levels stored on pixels through the storage capacitor. The display quality is affected.

Moreover, in such a structure, the total capacitance of each line depends on the video information displayed on the pixels in this line through the storage capacitor. This total capacitance depends on the sum of all coupling capacitances between this line and each column in the matrix, plus the sum of all storage capacitances in series with the associated liquid crystal capacitances made with this line, as a first approximation. This dependence may introduce display nonuniformities.

SUMMARY OF THE INVENTION

One purpose of the invention is to solve the different disadvantages related to use of such line drivers.

One technical solution was found in the invention to solve these different disadvantages, and particularly to delete the sensitivity to parasite couplings, by installation of a stabilization capacitor on each line. The value of this capacitor is chosen to be sufficiently large to stabilize the line and limit video disturbances, for example to a lower level than the pitch of the scale of grey levels of the display screen. This capacitor installed on each matrix selection line can stabilize the associated line level. Operation of the display and display performances, particularly the display uniformity, are improved.

Another purpose of the invention is to prevent losses of manufacturing efficiency related to the installation of such a capacitor on each line, by advantageously providing repair zones.

Therefore, the invention relates to an active matrix for a liquid crystal screen, comprising a plurality of pixel electrodes in an active zone, each of which can be addressed using one selection line among N selection lines and one data line among M data lines, a storage capacitor being connected to each pixel electrode in the matrix, characterised in that for each selection line, it comprises a line stabilisation capacitor in which a first electrode is connected to said selection line and a second electrode is connected to a reference voltage.

According to one embodiment of the invention, said stabilisation capacitor is formed outside the active zone of the display. It is connected between the associated selection line and a reference level of the display, typically a reference level among the analogue power supplies of the line control circuit.

In one improvement facilitating repair of the display, said stabilisation capacitor is formed from a parallel set of elementary capacitors.

According to another embodiment of the invention, the stabilisation capacitor of a selection line is formed in the active zone and is distributed along said line, using a conducting bus comprising parts facing selection lines separated from the level of these lines by at least one insulating layer. This bus may be made by a conducting plane, or by an network of parallel, vertical, or horizontal conductors. The conducting bus of the line stabilisation capacitor according to the invention can advantageously form an additional storage capacitor for each pixel.

The invention also relates to a liquid crystal matrix display comprising such an active matrix.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION OF THE PREFERRED EMBODIMENTS

Figure 1:
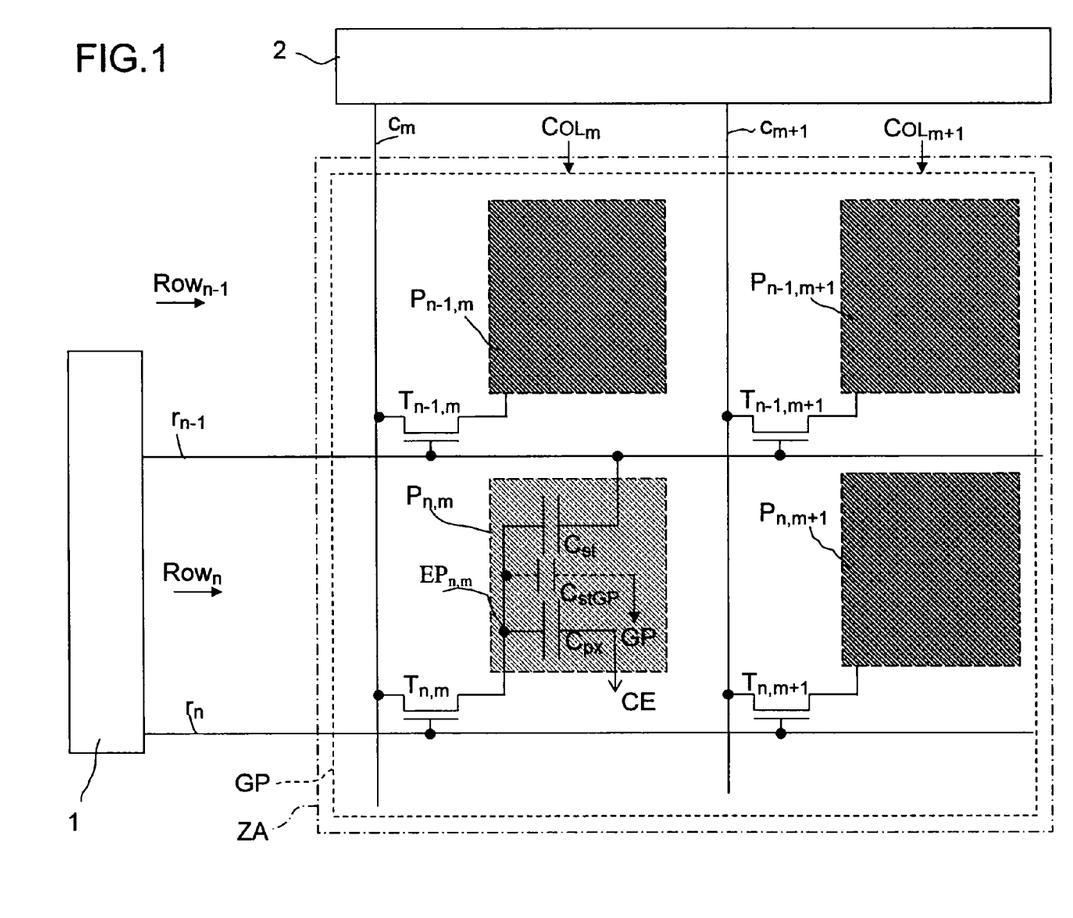
FIG. 1 illustrates an electrical diagram of an active matrix according to the state of the art.

FIG. 1 diagrammatically illustrates an active matrix of a display according to the state of the art that comprises N×M pixels arranged in N rows such as $Row_{n-1}$ and $Row_n$ and M columns such as $Col_m$ and $Col_{m+1}$. Each pixel can be addressed by a selection line and a data line of the matrix. A control circuit 1 of the selection lines, commonly called the "line driver", thus provides a sequential addressing signal on each of the N selection lines. In particular, it controls the selection lines $r_{n-1}$ and $r_n$ of rows $Row_{n-1}$ and $Row_n$.

A column control circuit 2, commonly called the "column driver" applies voltage levels corresponding to grey levels to be displayed on each of the M data lines associated with the M pixel columns. There is a data line controlled by the column driver 2, for each pixel column in the display. In particular, data lines $c_m$ and $c_{m+1}$ are data lines associated with columns $Col_m$ and $Col_{m+1}$ respectively.

The line driver 1 and the column driver 2 may be integrated in the matrix. In this case, they are made around the periphery of the active zone of the matrix, in other words the zone comprising the pixels. They may also be external to the matrix.

In the example shown, there is thus a pixel $P_{n,m}$ located on the nth row $Row_n$ and the mth column $Col_m$. It can be addressed by the selection of the selection line $r_n$ corresponding to raw $Row_n$ and application of a display voltage on the data line $c_m$ corresponding to column $Col_m$.

Each pixel comprises a pixel electrode $EP_{n,m}$ that is a conducting electrode made on the active matrix. This electrode is transparent in a transmissive application, and is opaque in a reflective application.

The display comprises the active matrix, a substrate forming a counter electrode and liquid crystal between the matrix and the counter electrode. A pixel capacitor is formed between each pixel electrode on the active matrix and the counter electrode CE of the display.

The pixel electrode $EP_{n,m}$ of the pixel $P_{n,m}$ is controlled by an active switching element, usually a transistor as shown in the figure. The pixel $P_{n,m}$ is thus associated with a transistor $T_{n,m}$, connected in series between a data line $c_m$ controlled by the column driver 2 and the pixel electrode $EP_{n,m}$. This transistor is controlled by a row selection signal corresponding to the pixel considered and applied by the line driver 1. In practice, the gate of this transistor is connected to (or formed by) the selection line of the row considered. In practice, the transistor gates of a single row are all connected to (or formed by) the same conducting line of the active matrix on which the line driver applies a row selection signal.

The transistor associated with a pixel is made active by applying a selection signal on the corresponding row selection line, for example on row $r_n$ for pixel $P_{n,m}$, and application of the voltage to be charged on an associated data line, for example on data line $c_m$ for pixel $P_{n,m}$. The transistor associated with a pixel thus charges this pixel $P_{n,m}$ to a voltage representative of the grey level to be displayed when the selection line is addressed. When the line is not selected, the transistor is equivalent to an open circuit, isolating the pixel from the remainder of the matrix, which should enable it to maintain the charged voltage level for as long as necessary for a video frame.

To achieve this, a storage capacitor is usually provided formed between the pixel electrode $EP_{n,m}$ and a conducting level of the active matrix, the pixel capacitor being insufficient to maintain the voltage level throughout the duration of a frame, due to couplings existing with adjacent selection and data lines, through parasite planar capacitances. This pixel storage capacitor may be made in different ways, used alone or in combination depending on the active matrix technology considered. In the example shown, a storage capacitor $C_{st}$ is formed between the pixel electrode and the previous selection line: for example, for pixel $P_{n,m}$, the storage capacitor $C_{st}$ is formed between the pixel electrode $EP_{n,m}$ and the selection line $r_{n-1}$. This capacitor may be made in different ways. For example, the so-called "capacitor on gate" structure is designed such that the pixel electrode partly covers the previous selection line. A conducting bus could also be provided between each pair of selection lines, which is electrically connected to the previous selection line.

In the example shown, there is an additional storage capacitor $C_{stGP}$ formed between each pixel electrode and a conducting plane GP, usually called the ground plane, brought to a reference voltage $V_{GP}$ and that in practice may be located below or above the matrix selection and data lines.

According to the invention, a stabilisation capacitor for this line is provided on each row selection line of the matrix, in order to increase the planar capacitance of the line. In this way, when the line is not selected, the planar capacitance of the line is such that this line and the pixels in this line can be made insensitive to the different disturbances due to the high impedance state of the corresponding output from the line driver 1. In particular, the multi-line selection effect is avoided.

Figure 2:
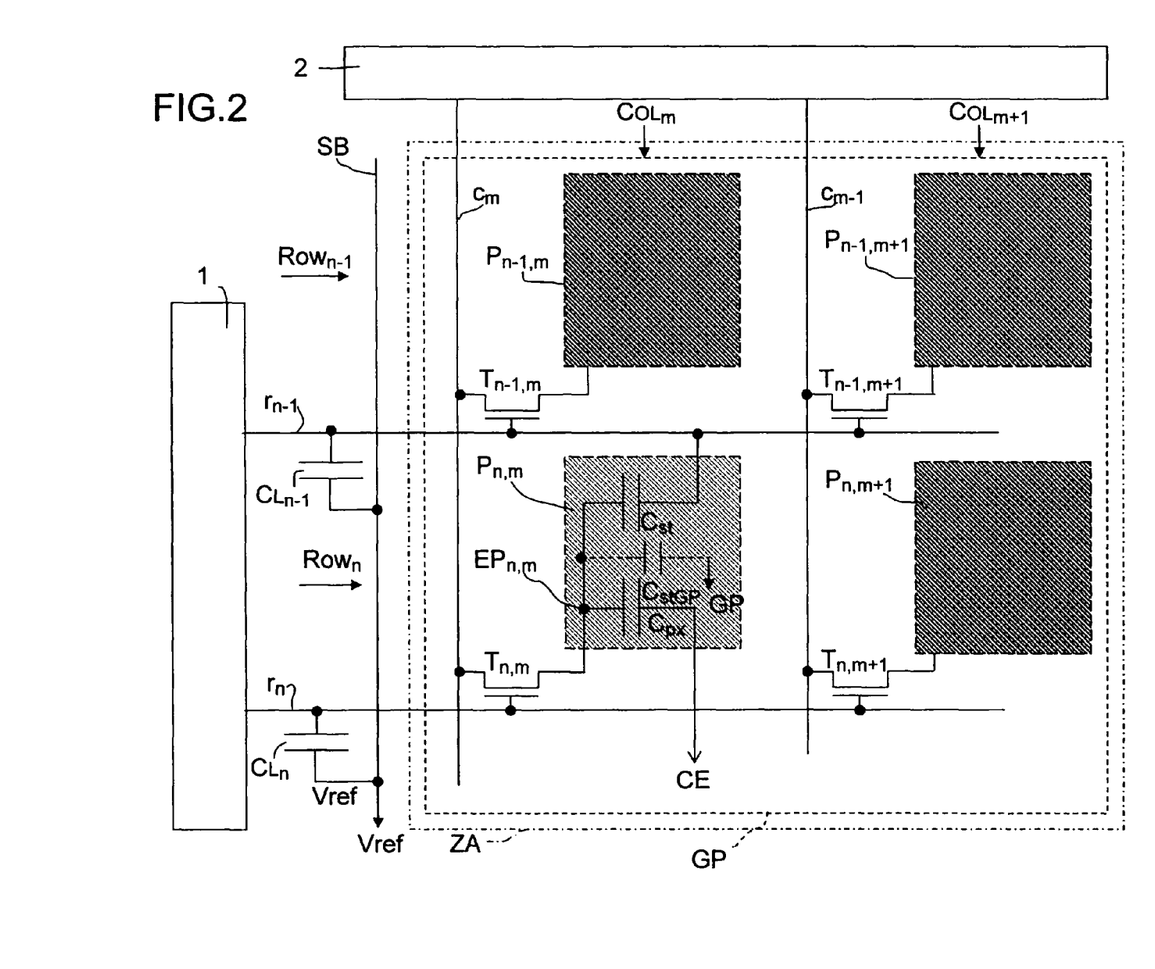
FIG. 2 illustrates a first embodiment of a line stabilisation capacitor according to the invention.

FIG. 2 illustrates a first embodiment of the invention according to which a stabilisation capacitor is made on each line outside the active zone of the matrix that contains the pixels with their transistors. In the example shown, this stabilisation capacitor is made between the outputs from line driver 1 and the active zone ZA materialised in dashed lines on the figure. Thus, there is a stabilisation capacitor $CL_{n-1}$ associated with line $r_{n-1}$, and $CL_n$ associated with line $r_n$. Each stabilisation capacitor is formed between the associated line that forms a first electrode, and a conducting bus SB that forms a second electrode powered by a reference voltage Vref. The reference voltage Vref is common to all stabilisation capacitors in the matrix.

The reference voltage Vref may be a specific voltage defined as a function of the characteristics of the display. This voltage Vref is a dc voltage. It may typically be the voltage $V_{GP}$ of the ground plane GP (FIG. 1), or the voltage $V_{CE}$ of the counter electrode. A reference voltage supplied by the line driver, typically the blocking voltage $Vg_{off}$ of transistors in the matrix, may also be suitable. The reference voltage Vref is common to all stabilisation capacitors in the matrix.

One practical and simple embodiment includes the formation of a conducting bus SP, typically a vertical bus, on the active matrix but outside the active zone, that crosses all selection lines. This conducting bus may be made on the matrix on a conducting level separated from the selection lines conducting level through at least one insulating layer, preferably on an existing technological level, typically on the same level as a conducting plane GP of the matrix as shown in FIG. 1.

Figure 3:
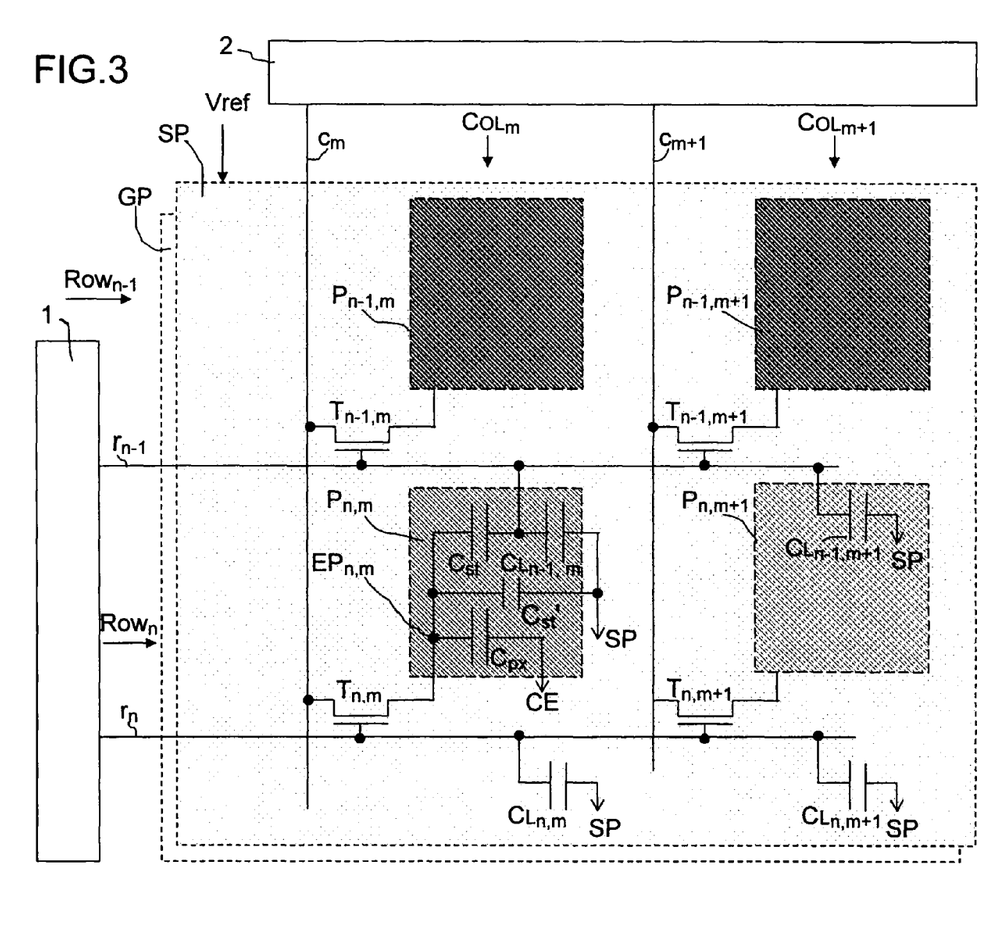
FIG. 3 illustrates another embodiment of this capacitor.
Figure 4:
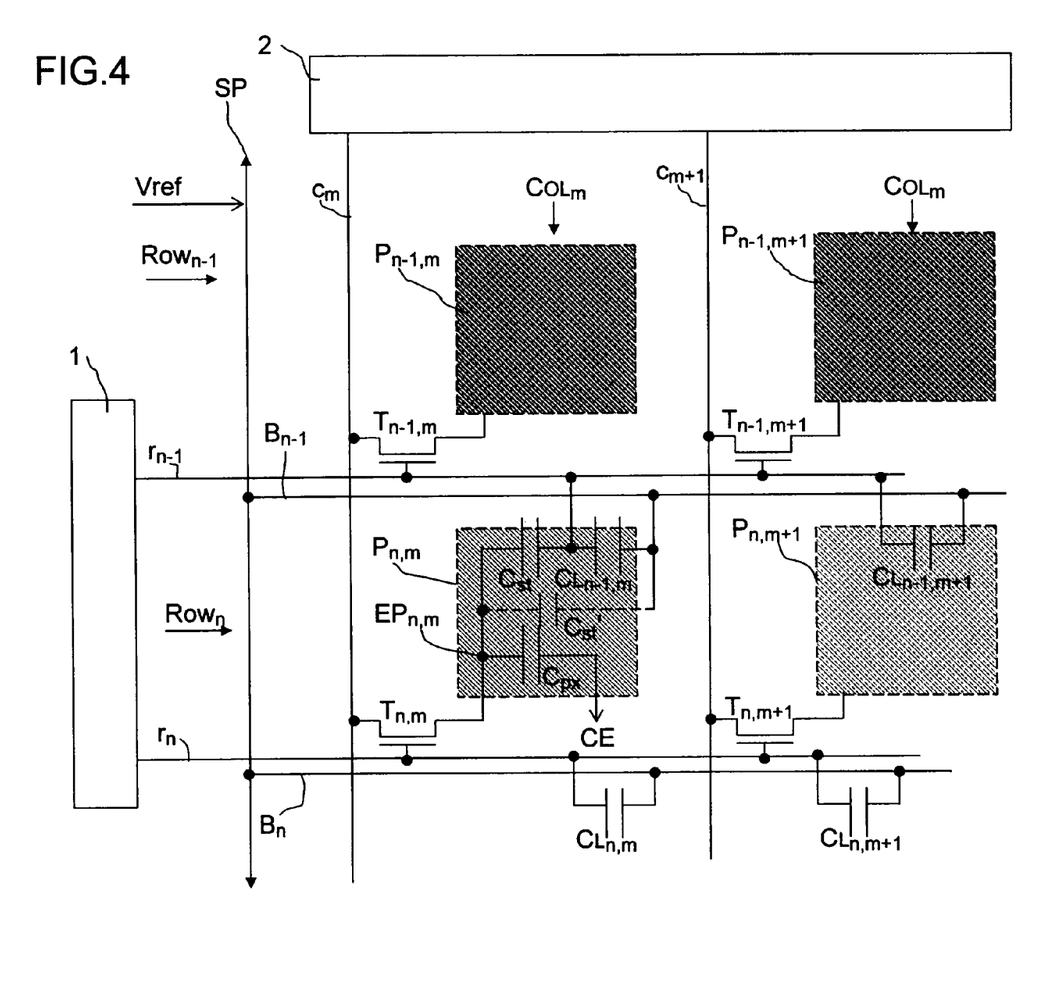
FIGS. 4 and 5 each illustrate a variant of the embodiment shown in FIG. 3.
Figure 5:
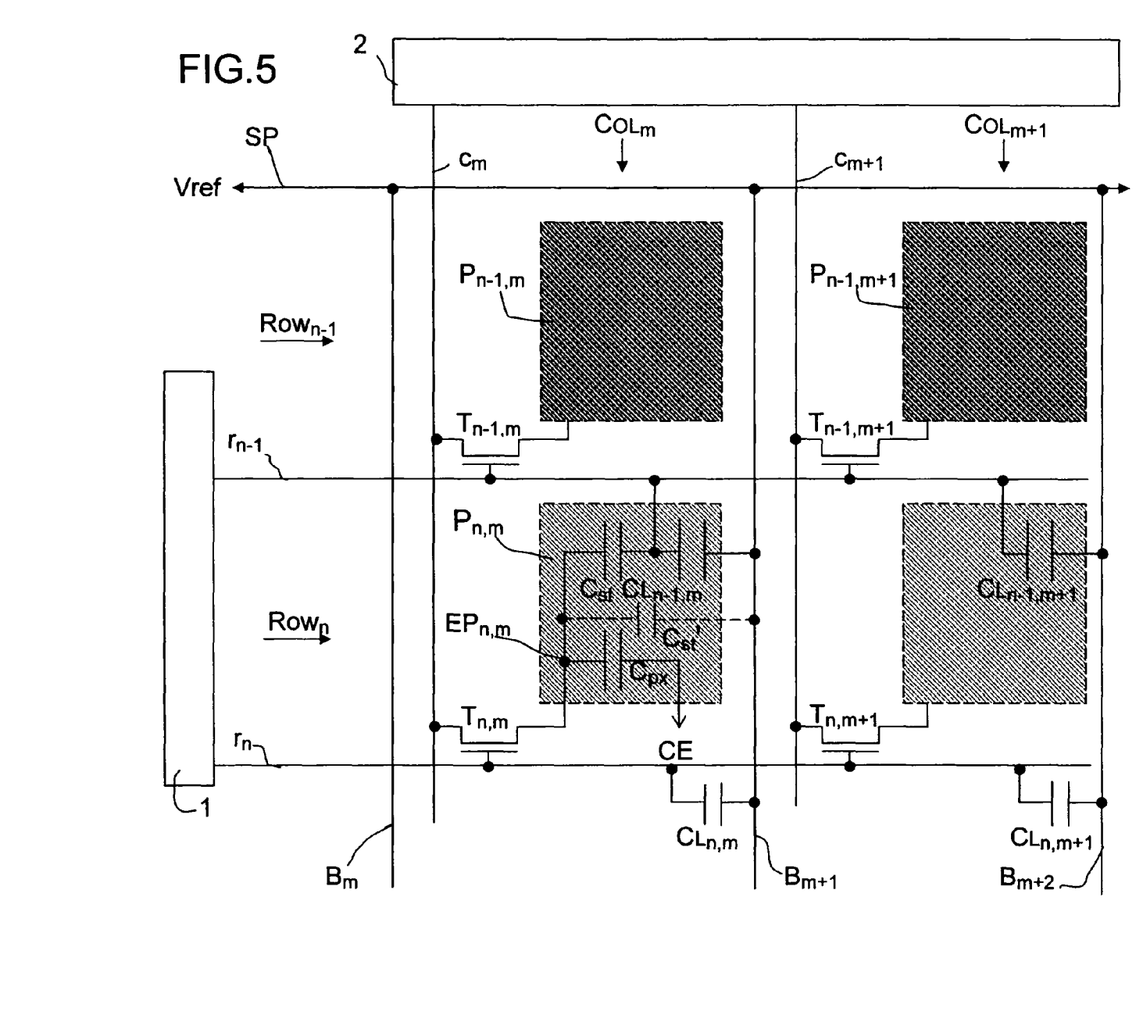

FIGS. 3 to 5 illustrate other embodiments of a stabilisation capacitor according to the invention in which the stabilisation capacitor is made in the active zone. In these embodiments, the stabilisation capacitor of a selection line $r_n$ is made in the active zone of the matrix and is distributed along this selection line. It is equivalent to M elementary capacitors in parallel: $CL_{n,m}$, $CL_{n,m+1}$ . . . , one per column (or data line).

In the example embodiment shown in FIG. 3, a conducting bus SP is used in the form of a conducting plane made below or above the selection and data lines of the matrix, in a transparent conducting material, brought to the reference voltage level Vref. This plane SP has solid parts facing the selection lines separated from the selection lines level by at least one insulation level, thus forming the stabilisation capacitors of the selection lines according to the invention.

The result is an elementary stabilisation capacitor associated with a selection line, for example the elementary capacitor $CL_{n-1,m}$ associated with line $r_{n-1}$, on column $Col_m$. This stabilisation capacitor $CL_{n-1,m}$ is connected between the selection line $r_{n-1}$ in the pixel column $Col_m$, and the conducting plane SP. This elementary stabilisation capacitor of line $r_{n-1}$ has a common electrode with the storage capacitor $C_{st}$ of pixel $P_{n,m}$. This storage capacitor $C_{st}$ is formed in column $Col_m$ between the pixel electrode $EP_{n,m}$ and the previous selection line $r_{n-1}$.

If the conducting plane SP comprises solid parts under the pixel electrodes, it also forms an additional storage capacitor Cst' for each pixel. This additional storage capacitor Cst' is represented on the figure for pixel $P_{n,m}$: this capacitor Cst' is formed between the pixel electrode $EP_{n,m}$ and the conducting plane SP, by the portion of this plane facing the electrode concerned.

Advantageously, this conducting plane SP is made by an existing technological level in the active matrix arranged above or below the selection and data lines of the matrix.

It can be seen particularly with reference to FIG. 1, that in some active matrix structures according to the state of the art, a capacitor $C_{stGP}$ is made between each pixel electrode and a conducting plane GP, for the part of this ground plane facing the pixel electrode.

This conducting plan GP is made from a transparent conducting material, for example ITO. It may be buried under the layers corresponding to the transistors, in other words under the matrix of selection lines and data lines. This buried ground plane is sometimes of the two-layer type, with an opaque layer in addition to the transparent layer, for example made of titanium forming an optical screen. It may be arranged above the selection and data lines of the matrix, for example as described in patent application EP 0682282 entitled "Liquid display device with shielded pixel structure". This conducting plane then corresponds to shielding, which has the effect of clipping field lines due to parasite planar capacitances between the pixel electrodes and selection and data lines.

Thus, as shown in FIG. 1, an active matrix may comprise a conducting plane GP in a known manner, made above or below the selection and data lines, brought to a determined reference level VGP and that provides a storage capacitor $C_{stGP}$ associated with each pixel, formed between the electrode of this pixel and this conducting plane.

FIG. 3 shows such an existing plane denoted GP. If this plane is used as a conducting plane to make a line stabilisation capacitor according to the invention, then this is equivalent to making the SP and GP planes in the figure coincident. The capacitor $C_{st}$' is then coincident with the capacitor $C_{stGP}$ made between the pixel electrode and the GP plane (not shown in FIG. 3, in order to simplify the drawing).

If this GP plane is not a continuous conducting plane, in other words if it is hollowed out, then use of the invention consists simply of modifying the drawing when necessary so that it also has solid parts facing the selection lines to form line stabilisation capacitors according to the invention.

One advantage of such an embodiment of the invention is that it uses a state-of-the-art technological level of matrices, which is advantageous in terms of production and limitation of the number of technological levels.

In another example embodiment shown in FIGS. 4 and 5, a specific conducting bus is added into the active matrix. In this embodiment, an elementary selection line stabilisation capacitor, for example capacitor $CL_{n-1,m}$ of line $r_{n-1}$ in column $Col_m$, is connected to the row selection line $r_{n-1}$ and formed with this specific conducting bus brought to a reference voltage Vref. This reference voltage is typically a DC power supply voltage which may be a specific voltage, or a power supply voltage output by the line driver 1. In practice, this specific voltage must be a stable dc voltage not sensitive to switching of intersecting tracks (coupling). Typically, the transistor blocking voltage Vgoff or the reference voltage applied on the ground plane GP shall preferably be used. The voltage level is determined principally so as to limit risks of optical outwards rotation or leaks (poor orientation of liquid crystal molecules, resulting from the parasite voltage generated by this network of conductors.

In the example shown in FIG. 4, this bus comprises a network of horizontal conductors $B_{n-1}$, $B_n$, each arranged between a pair of selection lines $r_{n-1}$, $r_n$, and parallel to them.

In the example shown in FIG. 5, this bus comprises a network of vertical conductors $B_m$, $B_{m+1}$, each arranged between a pair of data lines $c_m$, $c_{m+1}$, and parallel to them.

In one example embodiment of the network of horizontal conductors in FIG. 4, in practice the metal used can be the same as that used for the data lines $C_m$ (source/drain metal of TFT transistors), for example molybdenum (Mo) to make the line stabilisation capacitor. Outside intersection areas, the metal level of the selection line in parallel will preferably be used, for example a double layer of titanium and molybdenum (TiMo).

In practice, the network of vertical conductors in FIG. 5 can be made from the same metal as that used for selection lines (TiMo). The metal level for the data line in parallel (Mo) can be used outside intersection areas.

These horizontal or vertical conductors can also be made using the technological level of the buried ground plane or the shielding, or a special conducting level arranged below or above the data and selection lines, but in the form of a network of conductors in parallel rather than a continuous plane.

According to one aspect of the invention, if the design of this specific bus is defined to have at least part facing the pixel electrodes, this specific bus can be used as an additional storage bus for the pixels. The possibilities of using this aspect of the invention depend mainly on the space available in the pixel, the required efficiency, repair possibilities, etc.

FIG. 4 illustrates an equivalent electrical circuit of the pixel storage capacitor associated with the pixel electrode $EP_{n,m}$, and the stabilisation capacitor associated with the selection line $r_{n-1}$ according to the invention.

Thus, the result is the pixel electrode $EP_{n,m}$, the storage capacitor $C_{st}$, the stabilisation capacitor $CL_{n-1,m}$, the specific bus $r_{n-1}$, all in series.

If the design of the conductor associated with each selection line is such that it passes under the pixel electrode $EP_{n,m}$, the part of the bus facing the pixel electrode is also used as an additional storage capacitor $C_{st}$', as shown in dashed lines on FIG. 4, between the pixel electrode $EP_{n,m}$ and the bus. This can be typically obtained by arranging the circuit such that each conductor in the network passes under a row of pixel electrodes, with an offset towards the selection line so as to pass above or below this line, so as to make the stabilisation capacitor for this line. The fact that the conductor faces each pixel electrode creates the associated additional storage capacitor $C_{st}$'. In practice, these horizontal conductors can be made for example from a transparent conducting material, typically ITO, on the same level as selection lines, for the part passing under the pixel electrodes. Advantageously, the data line level could be used to make the offset to the selection lines, thus passing above the selection lines. As a result, no additional technological level is used for this network of specific conductors.

Similarly, FIG. 5 shows the storage capacitor $C_{st}$, the stabilisation capacitor $CL_{n-1,m}$, and in dashed lines, the storage capacitor $C_{st}'$ obtained if the design of the conducting bus is such that at least part passes under the pixel electrode considered. In practice, these vertical conductors can for example be made from a transparent conducting material, typically from ITO, on the same level as the data lines.

In general, the conducting bus according to the invention formed by a conducting plane or a network of conductors, is preferably formed from a transparent conducting material, so as to not disturb the pixel opening ratio. In particular, if it comprises parts below or above the pixel electrodes, as is the case particularly when it is required to benefit from an additional storage capacitor made with this bus, these parts must be made from a transparent conducting material, for example ITO. Other parts may be from an opaque conducting material, particularly parts facing the selection lines that are themselves opaque. These practical aspects of the embodiment will depend on selected design options and the technology considered.

Figure 6:
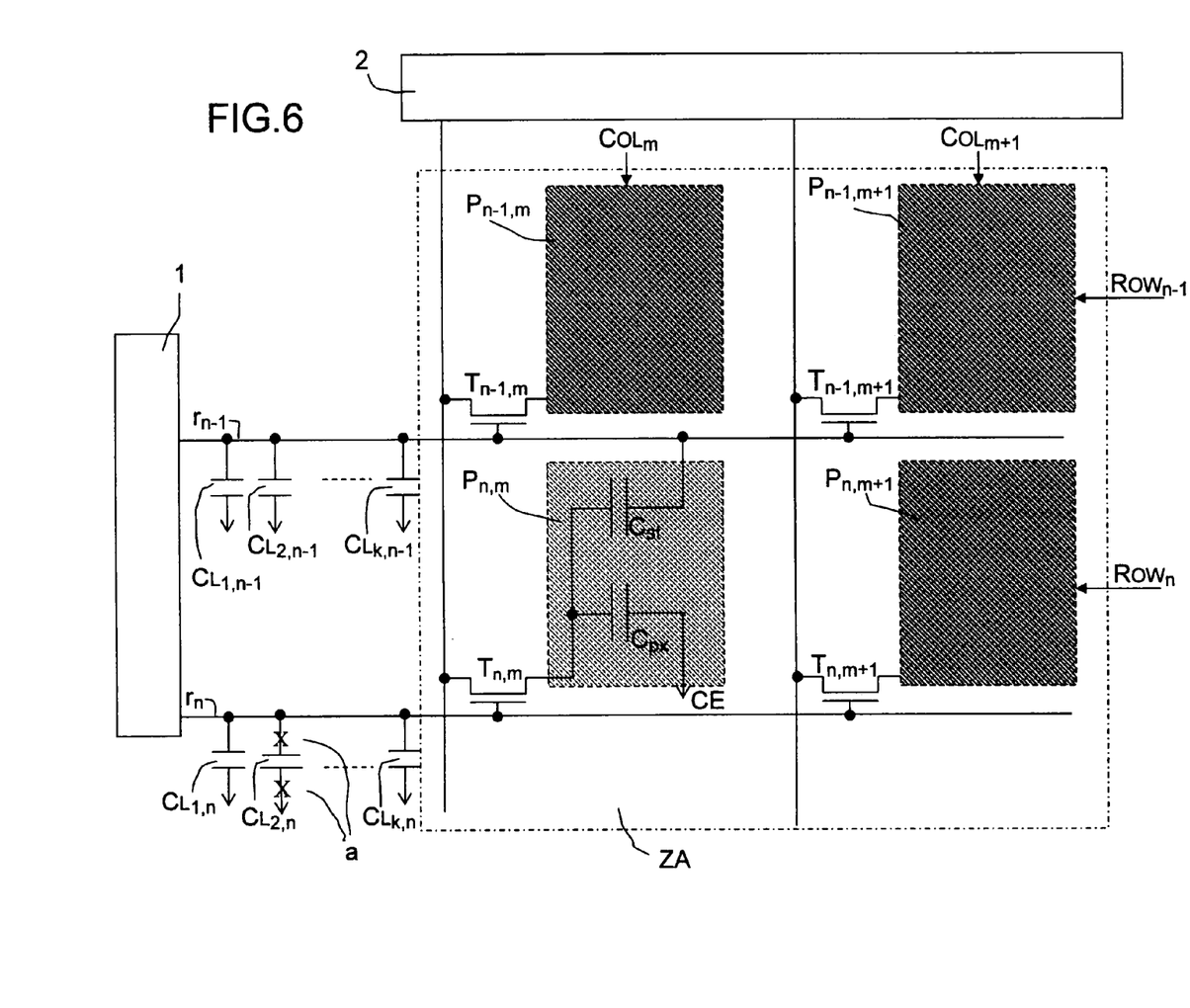
FIG. 6 illustrates a variant of the embodiment shown in FIG. 2.

FIG. 6 illustrates an improvement to the invention, applicable to the first embodiment of a stabilisation capacitor according to the invention outside the active zone, as described with reference to FIG. 2. This stabilisation capacitor is distributed: it is composed of n elementary capacitors in parallel. For example, for selection line $r_{n-1}$ there are k elementary capacitors in parallel $C_{1,n-1}, \ldots C_{k,n-1}$, and for selection line $r_n$, there are k elementary capacitors in parallel $C_{1,n}, \ldots C_{k,n}$.

If the value (capacitance) of the stabilisation capacitor according to the invention determined for a given display to give optimum display performances is denoted C, the value of each elementary capacitor will be equal to C/k. These k elementary capacitors are obtained using k conducting buses intersecting selection lines.

Such an embodiment advantageously facilitates repair of the matrix in the case of short circuits at intersections between lines and the vertical bus. It is known that short circuits can be located, for example during functional tests of drivers and the matrix, with visual marking of the vertical defect that short circuits the elementary capacitor(s). The defective elementary capacitor can then be isolated. For example, as shown in FIG. 6, the elementary capacitor $CL_{2,n}$ is isolated by making a cut out "a" on each side, typically using a laser. The value of C/k is determined so that, after isolation of the defective sub-capacitor, there is very little or no disturbance on operation of the line driver 1, nor on the video display on the pixels. The equivalent stabilisation capacitance then becomes equal to (k−1)C/k.

It will be noted that transparency or opaqueness aspects of the stabilisation capacitor bus are not important in this variant embodiment shown with reference to FIGS. 2 and 6, in which the stabilisation capacitor is made outside the active zone of the matrix.

The invention that has just been described can improve the display quality on active matrix liquid crystal screens, both on large and small screens without affecting the manufacturing efficiency, because it can be made using existing technological levels in the matrix, and use of the invention enables reliable repairs. The different embodiments described are chosen particularly as a function of existing technological levels in the active matrix considered. In particular, they depend on technological levels used to make the storage capacitors.

In particular, it is applicable to displays using active matrices with integrated drivers that have the special feature that they all have high impedance outputs. But it is more generally applicable every time that unselected selection lines are sensitive to electrical variations in their neighbourhood.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An active matrix for a liquid crystal display, comprising:
a plurality of pixel electrodes in an active zone, each of which can be addressed using one selection line among N selection lines and one data line among M data lines, the selection lines being selected in sequence by means of an integrated row driver; and
for each pixel electrode of the plurality of pixel electrodes, a storage capacitor connected to the pixel electrode and to a selection line other than the selection line to address the pixel electrode, the storage capacitor being configured to supply additional capacitance to a liquid crystal capacitor associated with the pixel electrode,
wherein for each selection line a line stabilization capacitor is provided for limiting video disturbances, each line stabilization capacitor having a first electrode connected to the selection line at an output of the integrated row driver and a second electrode connected to a conducting bus having a reference voltage applied thereto.

2. An active matrix according to claim 1, wherein the reference voltage is common to all stabilization capacitors in the matrix.

3. An active matrix according to claim 1, wherein the stabilization capacitor is formed outside the active zone.

4. An active matrix according to claim 3, wherein the stabilization capacitor for a selection line includes a plurality of elementary capacitors arranged in parallel.

5. An active matrix according to claim 3, wherein the conducting bus intersects the selection lines and is separated from the selection lines by at least one insulating layer.

6. An active matrix according to claim 5, wherein the conducting bus is made on or by an existing conducting plane of the matrix.

7. An active matrix according to claim 1, wherein the stabilization capacitor in a selection line is formed in the active zone and is distributed along the selection line, equivalent to a plurality of elementary stabilization capacitors arranged in parallel, one per data line.

8. An active matrix according to claim 7, wherein the second electrode in the stabilization capacitor of a selection line is formed by a conducting bus comprising at least parts facing selection lines separated from the level of these lines by at least one insulating level.

9. An active matrix according to claim 8, wherein the conducting bus comprises a network of vertical conductors, parallel to the data lines.

10. An active matrix according to claim 9, wherein the vertical conductors are made on one or more levels corresponding to the selection and/or data lines.

11. An active matrix according to claim 10, wherein the conducting bus is made on or by an existing conducting plane of the matrix.

12. An active matrix according to claim 8, wherein the conducting bus comprises a network of horizontal conductors, parallel to the selection lines.

13. An active matrix according to claim 12, wherein the horizontal conductors are made on one or more levels corresponding to the selection and/or data lines.

14. An active matrix according to claim 8, wherein the conducting bus is made by a conducting plane made above or below the selection and data lines and at a level separated from the level of these lines by at least one insulating level.

15. An active matrix according to claim 8, wherein the conducting bus comprises parts facing pixel electrodes, on a level separated from the pixel electrodes by at least one insulating level so that an additional storage capacitor is formed with each pixel electrode.

16. A matrix type liquid crystal display comprising an active matrix according to claim 1.

17. The active matrix according to claim 1, wherein each line stabilization capacitor is set to a value which limits disturbances on the corresponding selection line to a level lower than a pitch of a scale of grey levels of the liquid crystal display.

* * * * *